(12) United States Patent
Parmar et al.

(10) Patent No.: US 7,535,899 B2
(45) Date of Patent: May 19, 2009

(54) PACKET CLASSIFICATION

(75) Inventors: Pankaj N. Parmar, Beaverton, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/740,647

(22) Filed: Dec. 18, 2003

(65) Prior Publication Data

US 2005/0135351 A1 Jun. 23, 2005

(51) Int. Cl.
 *H04L 12/28* (2006.01)
(52) U.S. Cl. .................. 370/389; 370/408; 370/416
(58) Field of Classification Search ................ 370/389, 370/408, 416
 See application file for complete search history.

(56) References Cited

U.S. PATENT DOCUMENTS

| 6,041,053 | A  | * | 3/2000  | Douceur et al. | 370/389 |
|-----------|----|---|---------|----------------|---------|
| 6,970,462 | B1 | * | 11/2005 | McRae          | 370/392 |
| 7,075,926 | B2 | * | 7/2006  | Cathey et al.  | 370/389 |
| 7,203,963 | B1 | * | 4/2007  | Wu et al.      | 726/23  |
| 2002/0023089 | A1 |   | 2/2002 | Woo            |         |
| 2003/0123456 | A1 |   | 7/2003 | Denz et al.    |         |
| 2003/0196081 | A1 | * | 10/2003 | Savarda et al. | 713/153 |
| 2005/0078601 | A1 | * | 4/2005 | Moll et al.    | 370/218 |

OTHER PUBLICATIONS

Gupta, P., et al., "Algorithms for Packet Classification", *NPL Database WO Origin*, pp. 1-29, 2001.

Lakshman, T.V., et al., "High-Speed Policy-based Packet Forwarding Using Efficient Multi-dimensional Range Matching", *Computer Communication Review, Assoc. for Computing Machinery*, 28(4):203-214, Oct. 1998.

Singh, S., et al., "Packet Classification Using Multidimensional Cutting", *Computer Communication Review*, 33(4):213-224, Oct. 2003.

Srinivasan, V., "A Packet Classification and Filter Management System", *Proc. IEEE InfoCom, Conf. on Computer Communications of the IEEE Computer and Communications Societies*, Anchorage, AK, vol. 1 of 3, Conf. 20, pp. 1464-1473, Apr. 2001.

Srinivasan, V., et al., "Fast and Scalable Layer Four Switching", *Computer Communication Review, Assoc. for Computing Machinery*, 28(4):191-202, Oct. 1998.

Srinivasan, V., et al., "Packet Classification Using Tuple Space Search", *Computer Communication Review ACM USA*, 29(4):135-146, Oct. 1999.

Waldvogel, M., "Multi-Dimensional Prefix Matching Using Line Search", *Local Computer Networks, Proceedings 25th Annual IEEE Conf.*, pp. 200-207, Nov. 2000.

Woo, T., "A Modular Approach to Packet Classification: Algorithms and Results", *InfoCom 2000, Nineteenth Annual Joint Conf. of the IEEE Computer and Communications Societies. Proc. IEEE*, Tel Aviv, Israel, vol. 3, pp. 1213-1222, Mar. 2000.

* cited by examiner

*Primary Examiner*—Hassan Kizou
*Assistant Examiner*—Jay P Patel
(74) *Attorney, Agent, or Firm*—Fish & Richardson P.C.

(57) ABSTRACT

An apparatus and method includes grouping filters to form a tree according to a bitmask. The bitmask includes entries indicating whether a value is assigned to an element of a filter. The method also includes receiving a packet that includes a particular bitmask, searching the tree to determine filters associated with the particular bitmask and the associated values, and returning a set of filters that are an intersection of the filters indicated by the associated values.

33 Claims, 12 Drawing Sheets

| Filter ID | Bitmask | | Source Address | Destination Address | Port |
|---|---|---|---|---|---|
| F1 | 111 | (7) | 10 | 100 | 1000 |
| F2 | 111 | (7) | 20-30 | 200 | 1000-2000 |
| F3 | 101 | (5) | 10-30 | * | 3000 |
| F4 | 011 | (3) | * | 200 | 3000 |
| F5 | 101 | (5) | 20-30 | * | 1000 |
| F6 | 011 | (3) | * | 100-300 | 1000-3000 |
| F5 | 101 | (5) | 10 | * | 2000-3000 |
| F8 | 011 | (3) | * | 200-300 | 2000 |
| F9 | 011 | (3) | * | 300 | 1000 |
| F10 | 101 | (5) | 20 | * | 2000-3000 |
| F11 | 111 | (7) | 20 | 300 | 3000 |
| F12 | 111 | (7) | 10-30 | 100-200 | 2000-3000 |

| Bitmask | 10 | 200 | 3000 | Intersected set |
|---|---|---|---|---|
| 0,1,1 | N/A | F4,F6,F8 324 | F4,F6  326 | F4,F6  328 |
| 1,0,1 | F3,F7 | N/A | F3,F7,F10 | F3,F7 |
| 1,1,1 | F1,F12 | F2,F12 | F11,F12 | F12 |

| Bitmask | 10 | 200 | 3000 | Intersected set |
|---|---|---|---|---|
| 0,1,1 | N/A | F4,F6,F8 (376) | F4,F6 (378) | F4,F6 |
| 1,0,1 | F3,F7 (372) | N/A | F3,F7,F10 | F3,F7 |
| 1,1,1 | F1,F12 (374) | F2,F12 | F11,F12 | F12 |

PACKET CLASSIFICATION

BACKGROUND

Network infrastructure devices classify traffic based on a variety of protocol header fields to determine a packet's source, destination, protocol type, application type, and so forth. Such packet classification is used by network infrastructure devices such as routers, firewalls, and gateways. A packet classifier categorizes packets based on protocol header fields and determines a set of packet filters to apply to the packet.

DESCRIPTION

Figure 1:
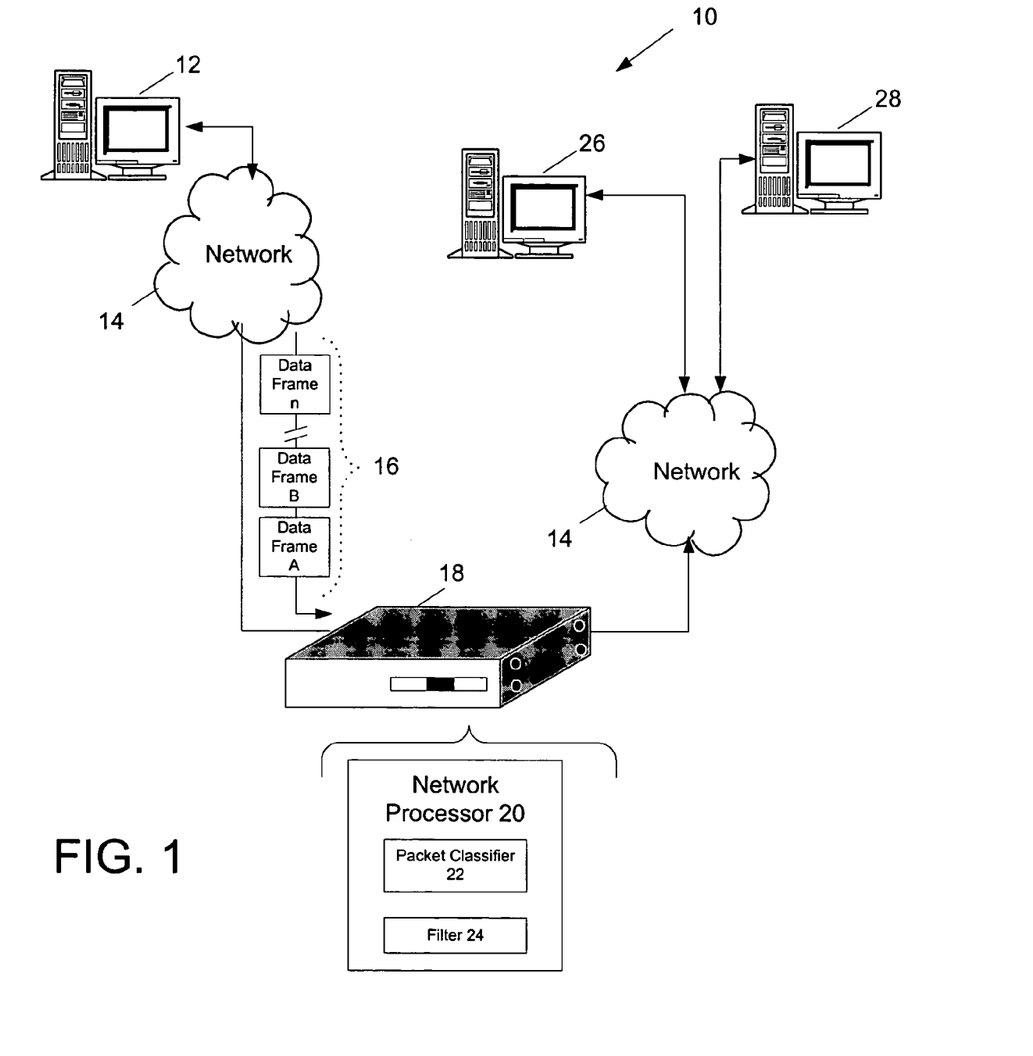
FIG. 1 is a block diagram depicting a system for processing data frames.

Referring to FIG. 1, a system 10 for transmitting data frames from a computer system 12 through a network 14 to computer systems 26 or 28 is shown. The system 10 includes a router 18 that collects a stream of "n" data packets 16, classifies the packets for transmission through the network 14 and delivers the packets to the appropriate destination computer system 26 or 28. Typically, a router 18 receives the data packet 16 and passes the packet 16 to a network processor 20 that controls the processing of the data packet 16.

The router includes a classification engine 22 that examines packets in order to route packets from a source location (e.g., computer system 12) to a destination (e.g., computer system 26). The classification engine 22 also determines an appropriate set of filters 24 to apply to the packet. Packet classification can allow a system to provide differential treatment to different packets to achieve different levels of quality of service (QOS). Packet classification also allows the system to change the priority of a packet, monitor traffic, collect statistics, or restrict network usage. A network device such as router 18 can include filters 24 and associate particular actions with the filters 24.

In order to apply the correct filter to a packet, a packet classifier matches values included in the packet to values for a filter. The packet filters include rules, ranges of values, subnets, wildcard values, and so forth. The filters are arranged in a balanced tree so that the classification engine searches the tree and determines the appropriate filters for the packet. Each filter is associated with an n-bit bitmask value where n is the number of filter elements. Each bit indicates whether the filter data for the corresponding filter element includes a non-wildcard value or not. The filters can be arranged in the balanced trees according to the bitmask providing the advantage of reducing the total computation time to generate a list of filters for a packet. The use of a balanced tree also can provide the advantage of reducing the memory requirements for storing and processing the filter lists.

Figure 2A:
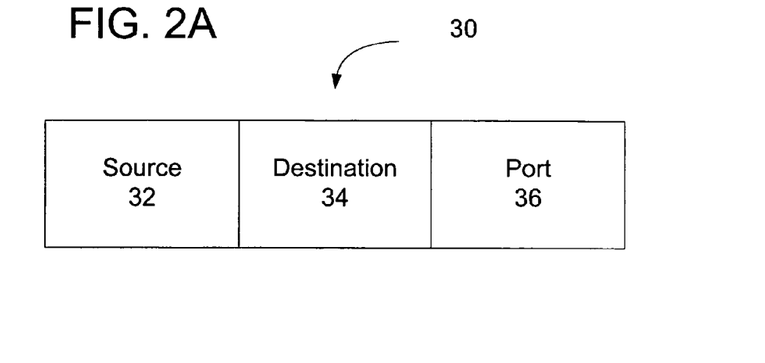
FIGS. 2A and 2B are diagrams of a bitmask and a table showing a mapping of filters to bitmask values.
Figure 2B:
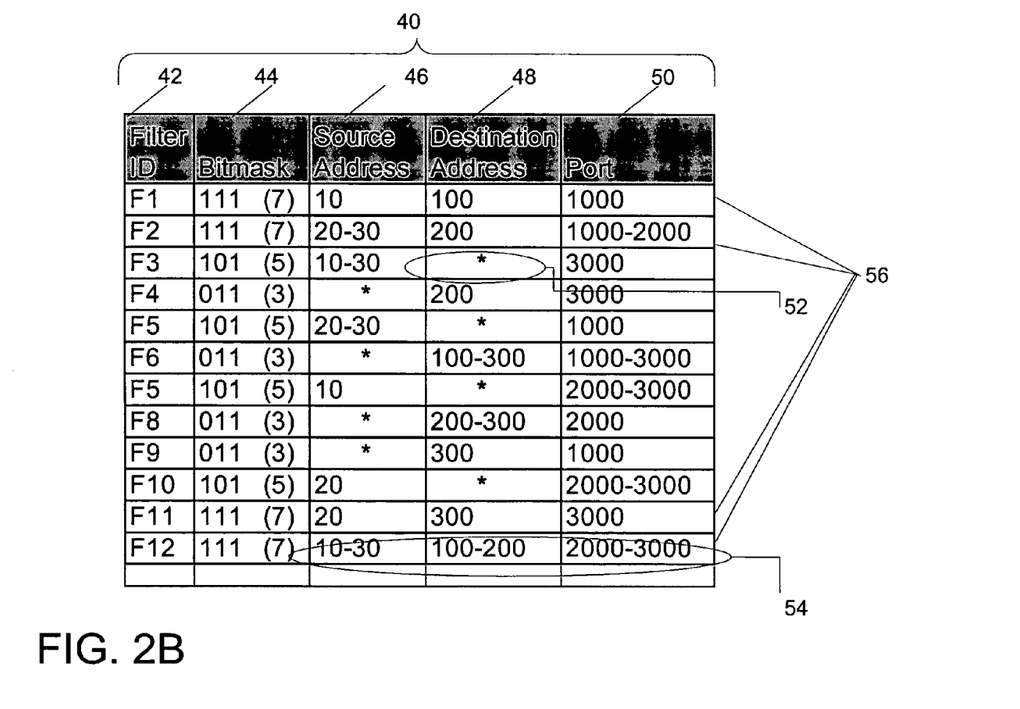

Referring to FIGS. 2A and 2B, an example of a bitmask and a list of filters is shown. In this example, a bitmask having three bits is shown. However, the number of bits in the bitmask can vary depending on the complexity of the filters and the number of packet header fields picked to filter by the filter elements.

Bitmask 30 includes three filter elements, a source element 32, a destination element 34, and a port element 36. Each bit in the bitmask entry includes a binary value of "0" or "1". A bitmask entry with a value of "1" at any bit position indicates that a non-wildcard value is associated with the corresponding filter element in the filter instance, while a value of "0" indicates a wildcard value. A wildcard is similar to a value range that includes all possible values for any given filter element. For example, a bitmask value of "110" indicates the source address and the destination address filter elements are not wildcard entries while the port is a wildcard entry. For each non-wildcard filter element, the filter includes a value for the filter element.

In order to classify the packet using bitmask 30, filters are associated with particular bitmasks and combinations of values for the source address 46., destination address 48, and port 50 as shown in table 40. Each filter is uniquely named by filter identification 42. The filter identification 42 is associated with a particular set of filter element values (e.g., the source address value 46, the destination address value 48, and the port value 50). In table 40 wildcard entries are denoted by a "*" in the value location. For example, filter F3 is associated with a bitmask of "101" such that the source address 46 and port 50 have assigned values for the filter. However the "0" in second bit position (from left)of the bitmask indicates a wildcard value for the destination address (denoted by the "*" as shown in dotted line 52). On the other hand, filter F12 is associated with a bitmask of "111," thus; the source address 46, destination address 48, and port 50 all have associated values. Since the values 46, 48, and 50 can vary for each of the three bitmask entries 32, 34, and 36, multiple filters can be associated with a particular arrangement of bitmask values as indicated by arrow 56 for bitmask value of "111".

Figure 3:
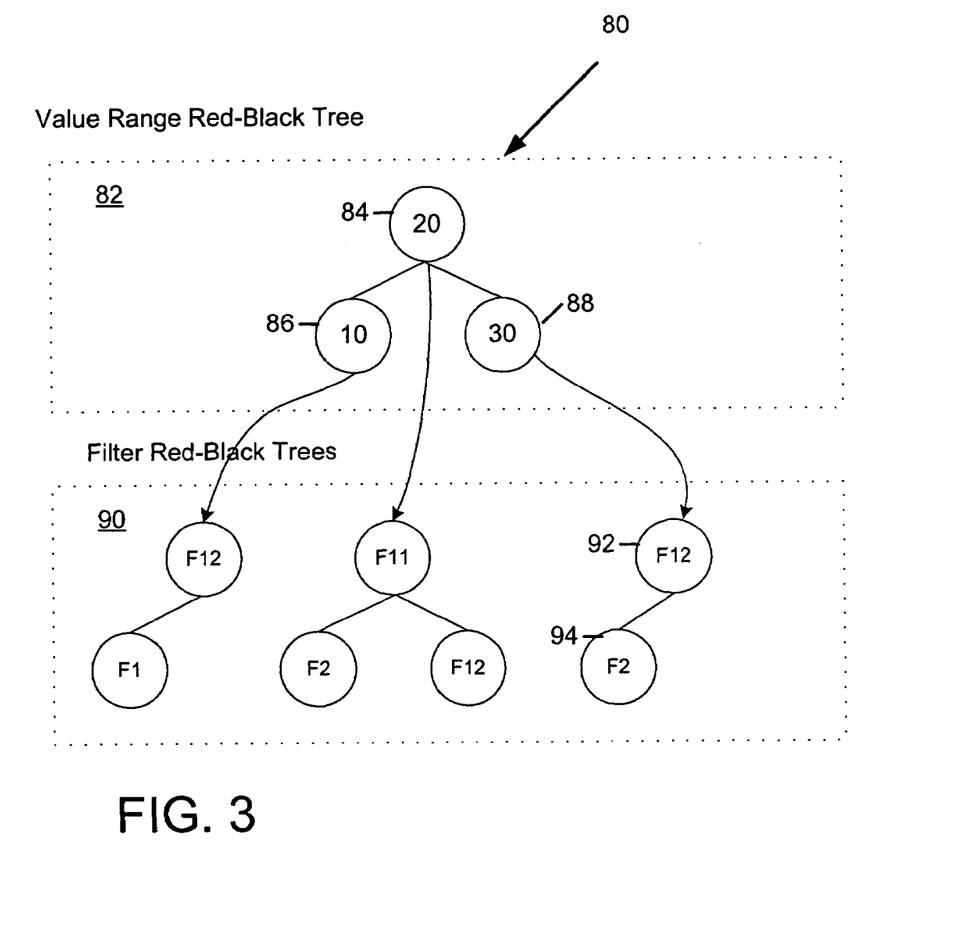
FIG. 3 is a diagram of a red-black data tree.

Referring to FIG. 3, filters can be grouped into a balanced tree to facilitate generating a list of filters for a particular bitmask and associated values. In this example, a red-black tree 80 is used to group the filters. A red-black tree is an example of a balanced data structure tree, having the feature that the data structure tree remains balanced with the addition of nodes. A red-black tree can reduce search times to O(logn) in dynamic environment where O(1) is the time to complete one operation. Red-black tree 80 is divided into two portions: a value range red-black tree 82 and a filter red-black tree 90. Each node on the value-range red-black tree 82 is a parent to a filter red-black tree 90.

The red-black tree 80 represents a tree for the source address filters for filters with a bitmask of "111" (e.g., filters with assigned values for all three entries) as shown in table 40. Source addresses range from 10-30 and thus the values of 10, 20, and 30 are represented as nodes 84, 86, and 88 in the value range red-black tree 82. The filters for each value are arranged to form filter red-black trees 90 under each node 84, 86, and 88.

The packet classifier uses red-black trees to determine filters for a packet. For example, if a packet has a source value of 30 and the system is searching a tree for the bitmask value of "111" the list of filters based only on the source value would include F12 and F13 (nodes 92 and 94). The values of the other elements (e.g., the destination address and/or the port) determine the particular filter or set of filters for the packet.

Figure 4:
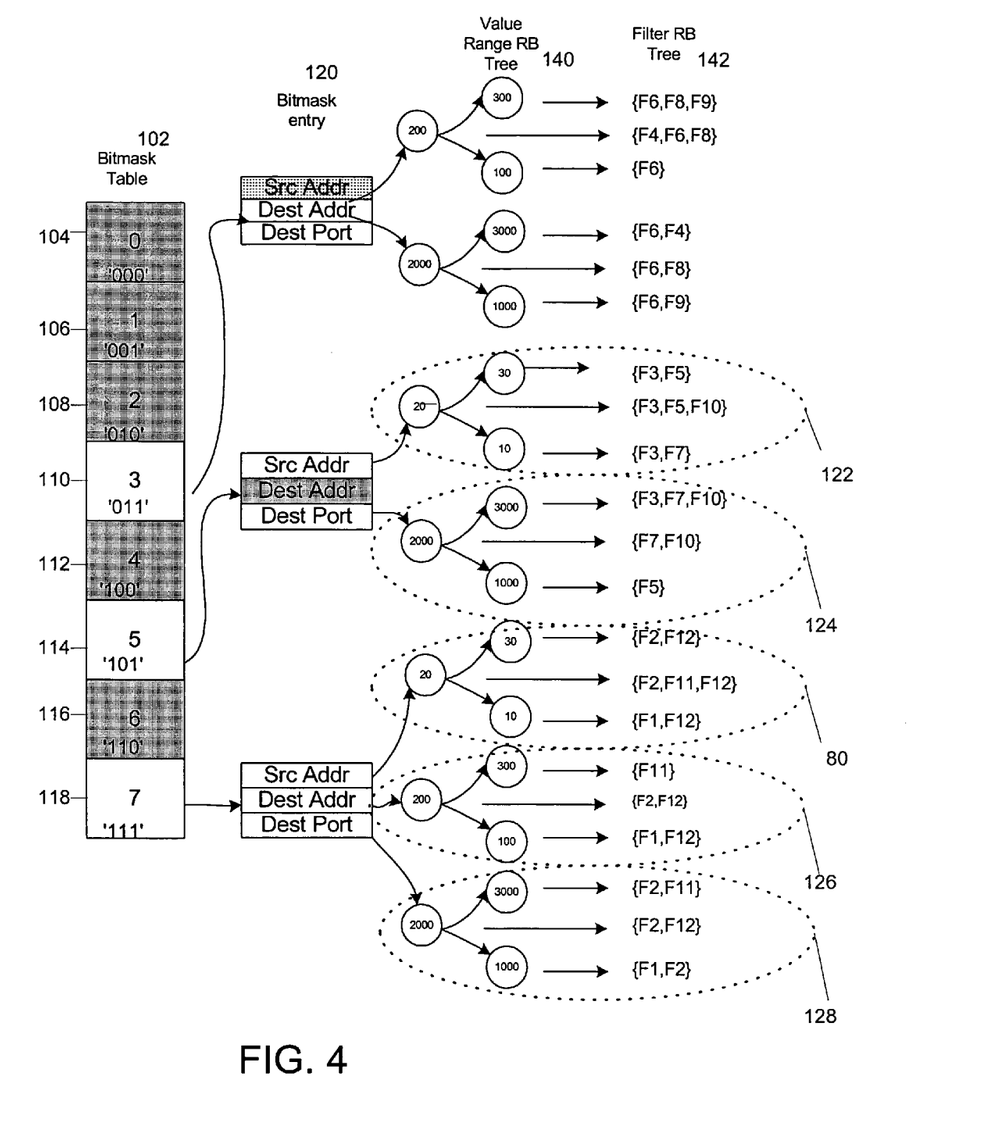
FIG. 4 is a diagram of a data tree based on bitmask entries.

Referring to FIG. 4, a grouping of filters according to the bitmask value is shown. The grouping of the filters forms value range red black trees 140 and filter range red black trees 142 for each combination of bits in the bitmask. The filter range red-black trees are shown as lists for simplicity. Red-black trees are an example of a balanced tree. In general an algorithm to locate entries in a database uses a tree structure. The algorithm finds data by repeatedly making choices at decision points called nodes. A node can have as few as two branches (also called children), or as many as several dozen. In a balanced tree each branch on either side of the root node is of equal length.

Each combination of bits in the bitmask is included in a bitmask table 102 and each entry in the bitmask table points to a bitmask entry 120. The bitmask entry includes pointers to a red-black tree for each non-wildcard bit in the bitmask. Gray shading in the appropriate bit location denotes wildcard entries. For example table entry 114 of "5" is associated with a bitmask entry of "101" and includes pointers to two red-black trees (i.e. red-black trees 122 and 124) for the first and third bits of the bitmask. While a bitmask value of "7" in the bitmask table would be associated with a bitmask entry of "111" and would include three pointers to red-black trees 80, 124, and 120 for each respective bit of the bitmask.

The number shown in bitmask column 44 of FIG. 2B, (within the parentheses) corresponds to the decimal value of the bitmask for each filter in the table 40. For example, "001" is represented as 1, "010" is represented as 2, "011" is represented as 3 and so forth. Bitmask table 102 in FIG. 4 inserts the bitmask entries based on this numerical representation and forms an entry 104, 106, 108, 110, 112, 114, 116, and 118 in the table for each number 0-7. There are eight (8) entries in the bitmask table for a three-bit bitmask, however, the number of entries is dependent on the number of bits in the bitmask. For example, a two-bit bitmask would have four (4) entries in the bitmask table while a four-bit bitmask would have 16 entries and so forth. In general, for a bitmask with n entries, the bitmask table includes $2^n$ entries and the values of the numerical representation of the bitmask will range from 0 to ($2^n-1$).

Each entry in the bitmask table 102 includes pointers to red-black trees. In this example, there are three pointers for each entry corresponding to the source address, destination address, and port address. If the filter element is a wildcard, the corresponding red-black tree pointer is empty. For example, for bitmask "011" (represented by a numerical value of 3 table entry 110) the corresponding bit-mask entry will hold only two non-empty red-black tree pointers: one for the destination address and the other for the port. The red-black tree pointer corresponding to the source address is empty (e.g., NULL) since it is a wildcard entry.

A bitmask value of "000" indicates all entries are wildcards and has a special meaning. A list of filters for this bitmask is stored in a list (not a red-black tree) because the order does not apply in this situation. The filters in the "000" list apply to all packets. In most applications, the list for bitmask "000" includes a single filter.

Figure 5:
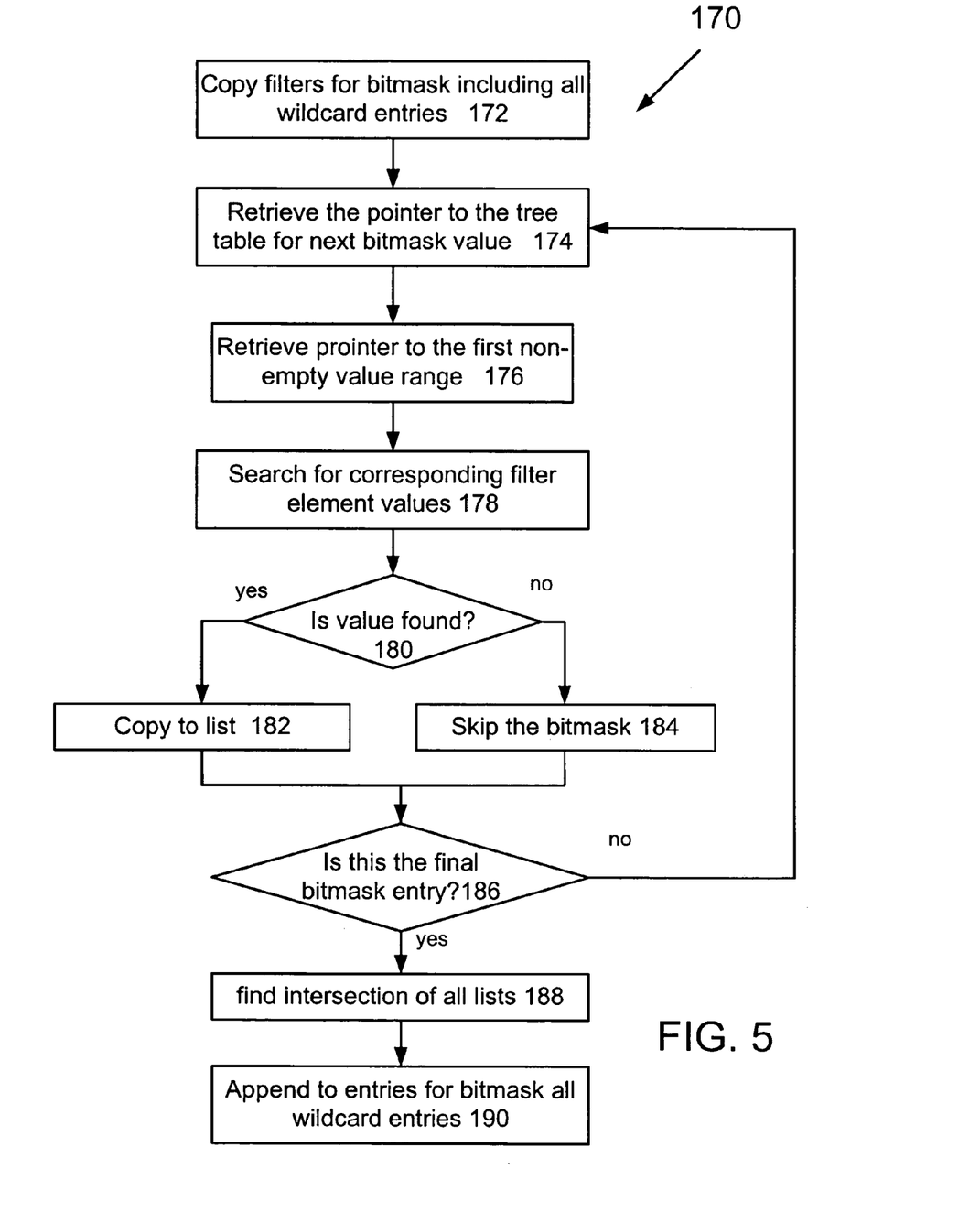
FIG. 5 is a flow chart of a process to determine an appropriate set of filters for a packet.

Referring to FIG. 5, a process 170 for determining a set of filters for a packet based on the filter elements (e.g., source address value, destination address value, and port value) of the packet and a list of filters arranged according to the filter bitmask is shown. Process 100 copies 172 the filters for the bitmask that includes all wildcard entries (e.g., the "000" bitmask) to the final resultant filter set 190. Process 170 retrieves 174 the pointer to the tree table for the next bitmask entry (e.g., 001). For each non-empty value range red-black tree in the bitmask entry, Process 170 searches the value range red-black tree for the corresponding filter element and determines 180 if the filter element value corresponds to the value of the respective protocol header field in the packet. If a match is found in each red-black tree, process 170 copies the set of filters included in the corresponding filter red-black tree to a temporary list. For each matching bitmask entry, this list maintains per filter element filter sets. If no matching or partially matching entries are found, process 170 skips 184 the bitmask. Process 170 determines if the current bitmask entry is the final bitmask entry in the list of entries and if not, process 170 retrieves 174 the pointer to the tree for the next bitmask value and repeats the process. When process 170 determines 186 that the bitmask is the final bitmask entry, process 170 generates an intersection of the set of per filter element filter lists for each entry in 182, and copies the intersected resultant list to 188. List 188 is appended to a list includes all filters with all wildcard entries. List 190 represents the final set of matching filters for a given packet.

Figure 6A:
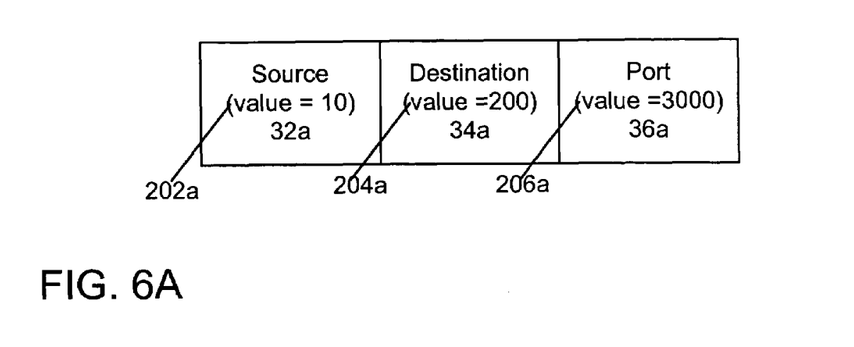
FIGS. 6A-6C are diagrams depicting a particular set of address values, a table of filters, and an associated data tree.
Figure 6B:
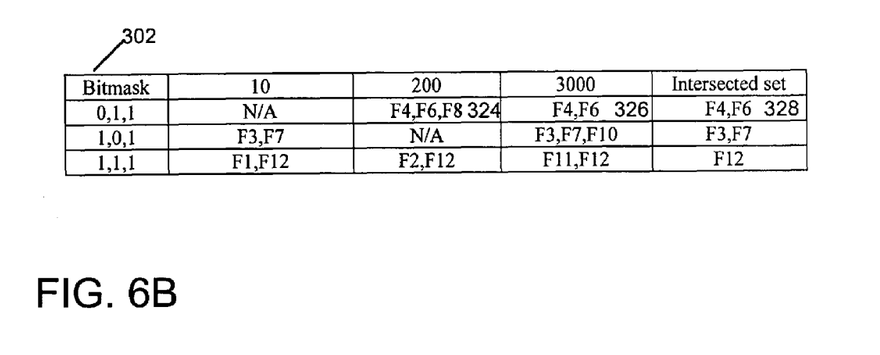

Referring to FIG. 6, an example of a set of filters that are selected using process 170 and the filter tree (FIG. 2) is shown. For example, if a packet includes a source address value (202a) of 10, destination address value (204a) of 200, and a port value (206a) of 3000 as shown in FIG. 2A. As indicated in table 40 (FIG. 2B) in this example there are no filters associated with bitmasks of "000", "001", "010", "100", and "110" as indicated by the shaded boxes. Since there are no filters associated with bitmask entries with numerical representation values of 0-2, these entries are not processed. The first entry the packet classification engine processes is the entry for "011". The packet classification engine retrieves pointers to value range red-black trees for destination address 124 and the port address 126. A pointer is not included for the source address since this is a wildcard entry (signified by the "0" entry) in the filter's bitmask. The classification engine searches for the address value of 200 in the destination address tree. Under node 142, the filter red-black tree includes entries 144 for filters F4, F6, and F8. These nodes of the filter red-black tree under the address value range node for 200 are added to a list (as shown in block 324 of FIG. 6B). The classification engine also searches for the address value of 3000 in the port address tree. Under node 148, the filter red-black tree includes entries 150 for filters F4 and F6. These nodes of the filter red-black tree under the address value range node for 200 are added to a list (as shown in block 326 of FIG. 6B). The table 300 in FIG. 6B represents list 182 in FIG. 5.

The classification engine repeats the process and generates lists of filters using bitmask entries represented in the bitmask table of 3 and 5. The generated lists of filters are shown in table 300.

For each list of filters sorted by the bitmask in table 300, the classification engine generates an intersection of the filter sets as shown in column 310. For example, for bitmask 011, the intersected set (shown in block 328) includes filters F4 and F6, but does not include F8 that is only found under the destination column and not the port column. The union of all intersected sets provides the set of packet processing filters to process the packet. In this example, the determined set of filters (e.g., the union of all intersected sets) for this particular packet includes filters F3, F4, F6, F7, and F12.

Figure 6C:
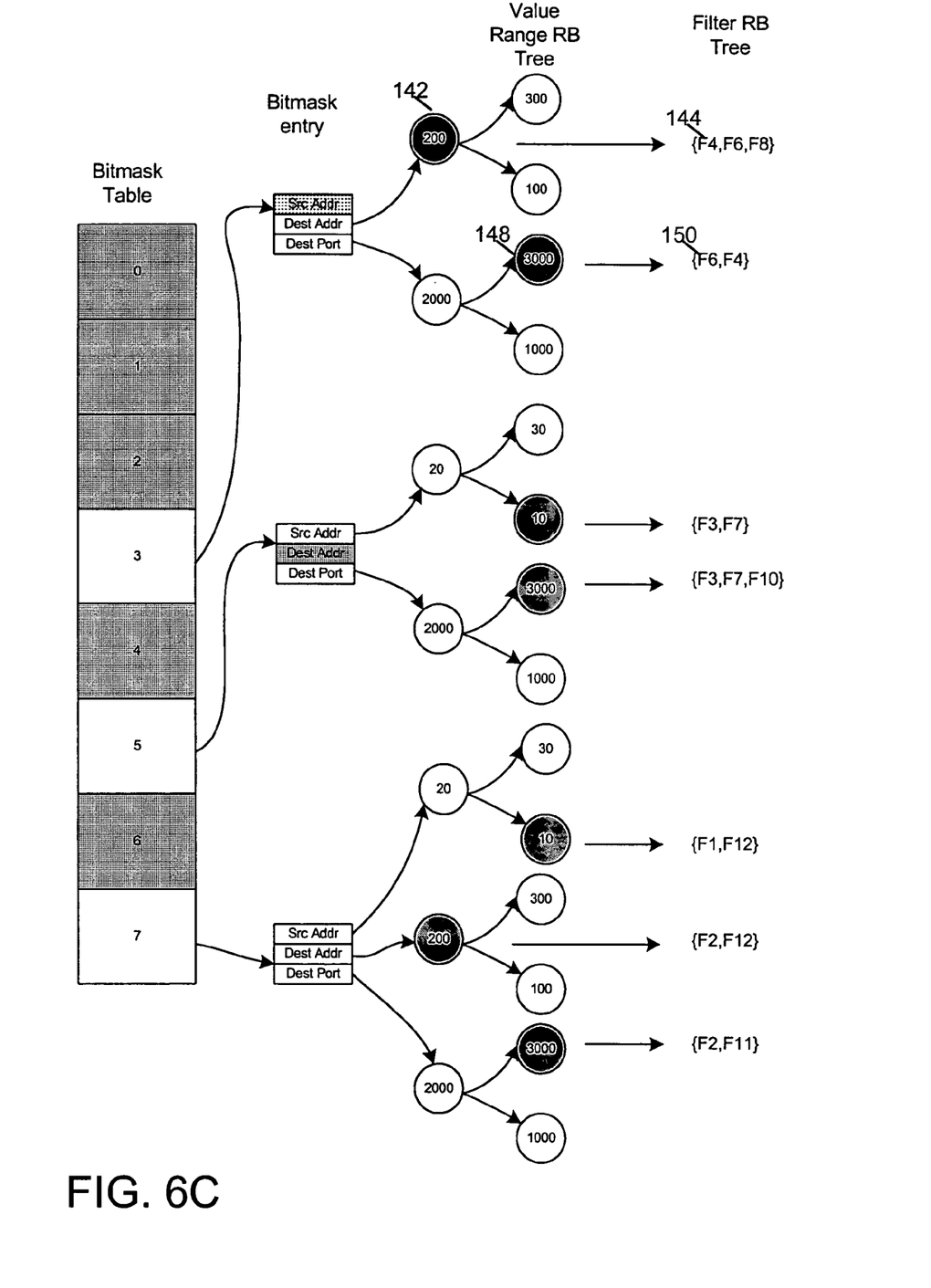

While the examples in FIGS. 4-6 are based on a classification of filters based on the numerical representation of the bitmask for each filter, other representations and classifications are possible.

Figure 7A:
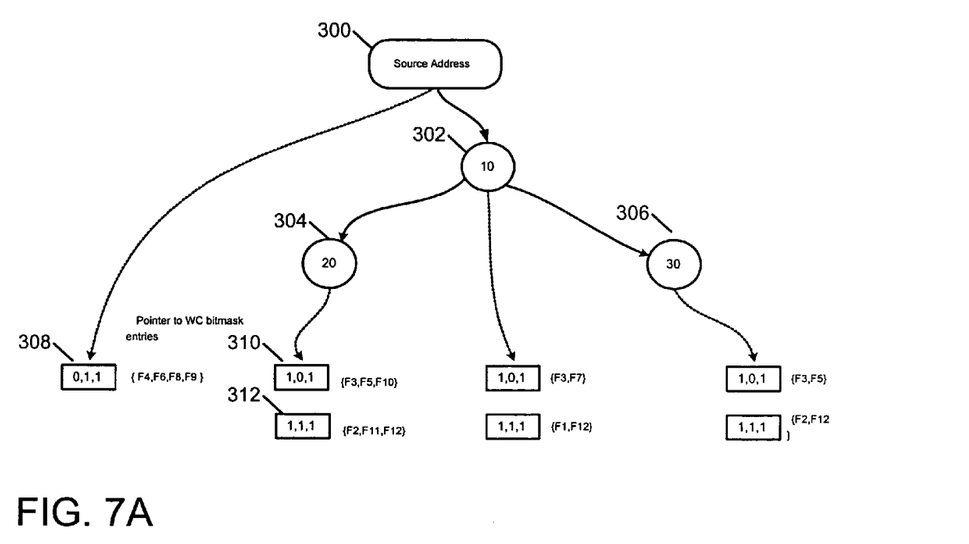
FIGS. 7A-7C are diagrams depicting a data trees based on a source address, destination address, and port address.
Figure 7B:
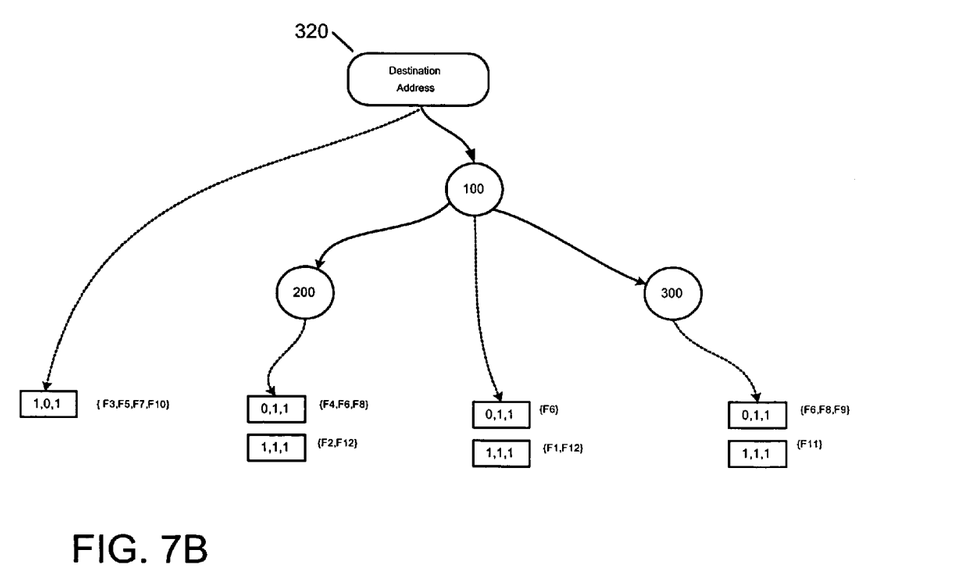
Figure 7C:
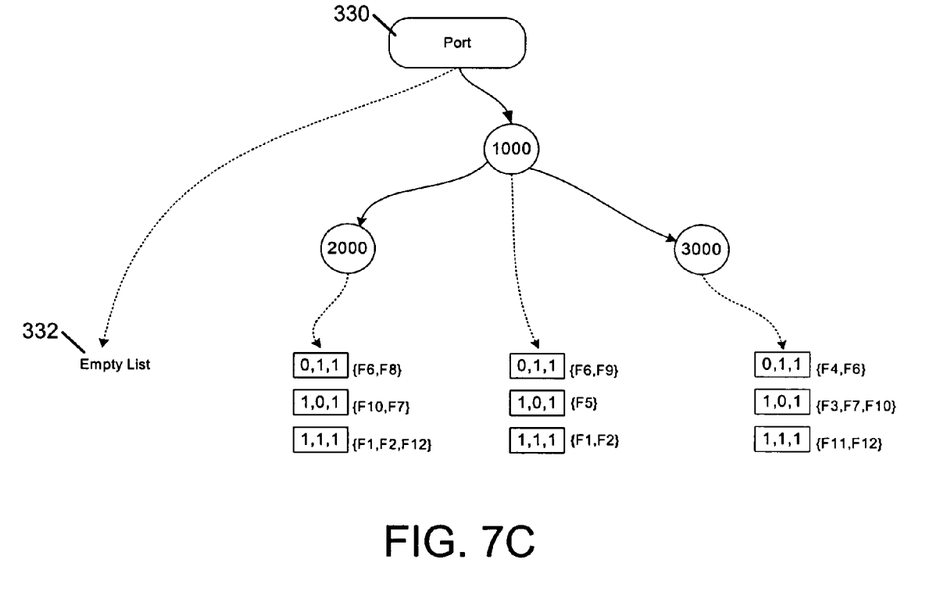

Referring to FIGS. 7A-C, an alternate arrangement of the filters into red-black trees according to a bitmask is shown. This classification is based on bitmasks at the node level instead of the bitmask level and thus, does not include a bitmask table. The filters are grouped according to a particular bit of the bitmask to generate a red-black tree including a set of filter element values associated with each bit of the bitmask. In this example, three red-black trees are used to classify packets; a source address red-black tree 300 (FIG. 7A), a destination address red-black tree 320 (FIG. 7B), and a port red-black tree 330 (FIG. 7C). Based on the filters in table 40, filters F4, F6, F8, and F9 are included in the list of filters having a wildcard value for the source address. For a source address value of 20, the system includes entries for bitmasks "101" and "111" each with an associated list of filters 310 and 312. The red-black tree for the destination address 320 and the red-black tree for the port 330 are similar to the source address tree. If no filters result for a particular combination, an empty list is returned. For example, empty list 332 is returned for a wildcard entry for the port address. While this example is represented with a particular set of filters, it is understood that the method is not limited to this set of filters.

Figure 8:
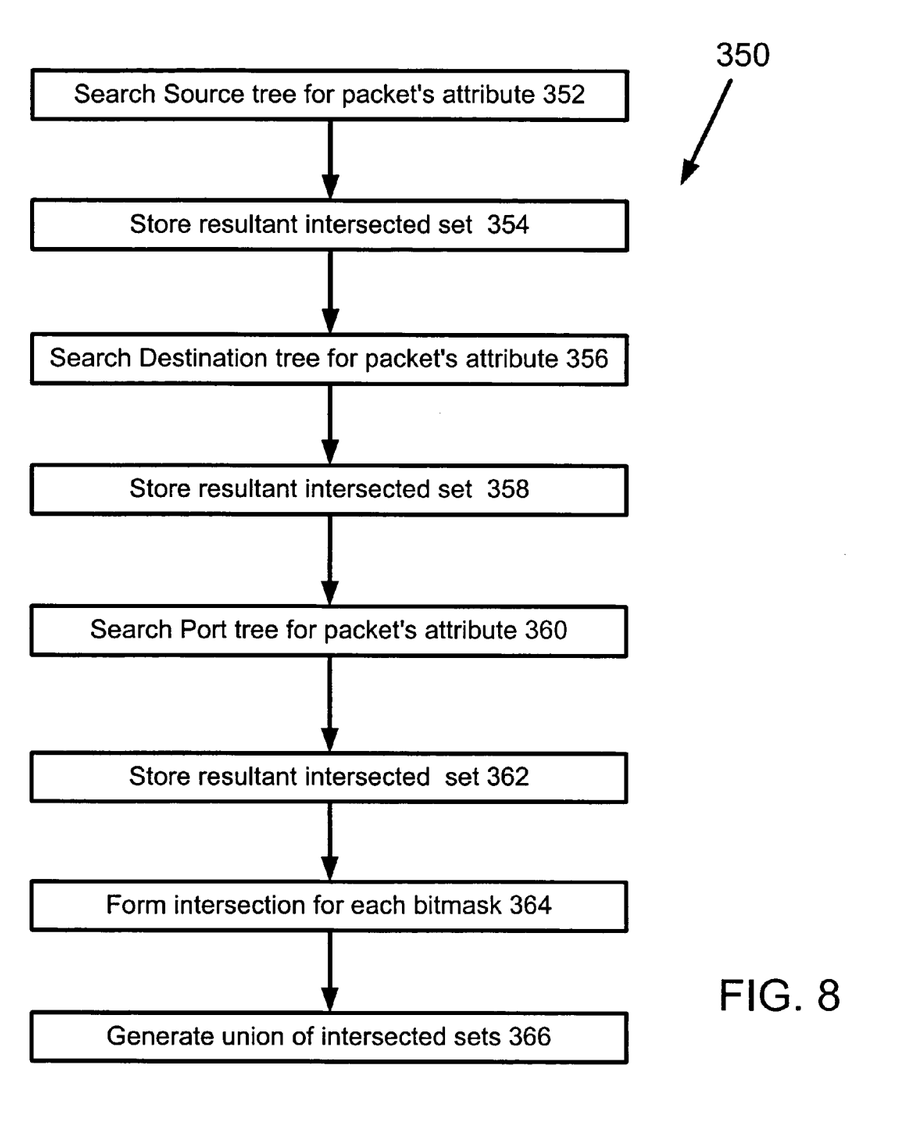
FIG. 8 is a flow chart of a process to determine an appropriate set of filters for a packet.

Referring to FIG. 8, a process 350 for determining a set of filters matching a packet based on the filter bitmask and associated values for the packet using the red-black trees organized by the bits in the bitmask is shown. Process 350 searches 352 the source tree 300 for the source address value included in the protocol header of the packet. If a matching entry is found, process 350 stores 354 all determined sets (one per bitmask value) of filters for the source address value. Process 350 searches 356 the destination tree 320 for the associated destination address value and process 350 stores 358 the determined sets of filters for the destination address value. Process 350 searches 360 the port tree for the associated port value and process 350 stores 362 the determined sets of filters for the port value. Process 350 generates an intersection of the set of the filters for each filter element and for each bitmask. This intersection set represents the filters that are common between the lists of filters and includes the filters associated with a particular bitmask and address values for the packet. Process 350 generates 366 a union of all the intersected sets per bitmask. This union of intersected sets is the set of filters for the packet.

Figure 9A:
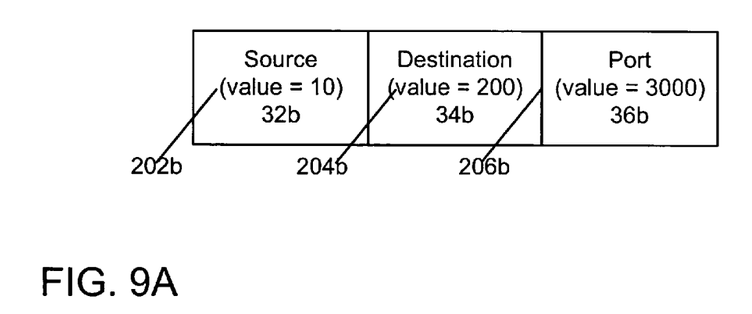
FIGS. 9A-9C are diagrams of a particular set of address values, a table of filters, and associated data trees.
Figure 9B:
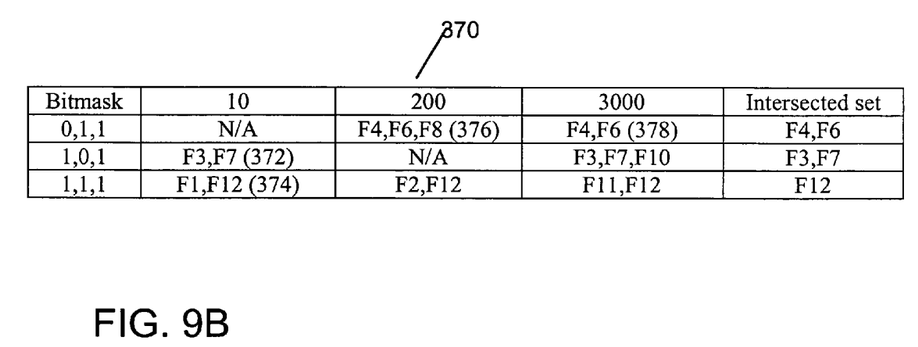
Figure 9C:
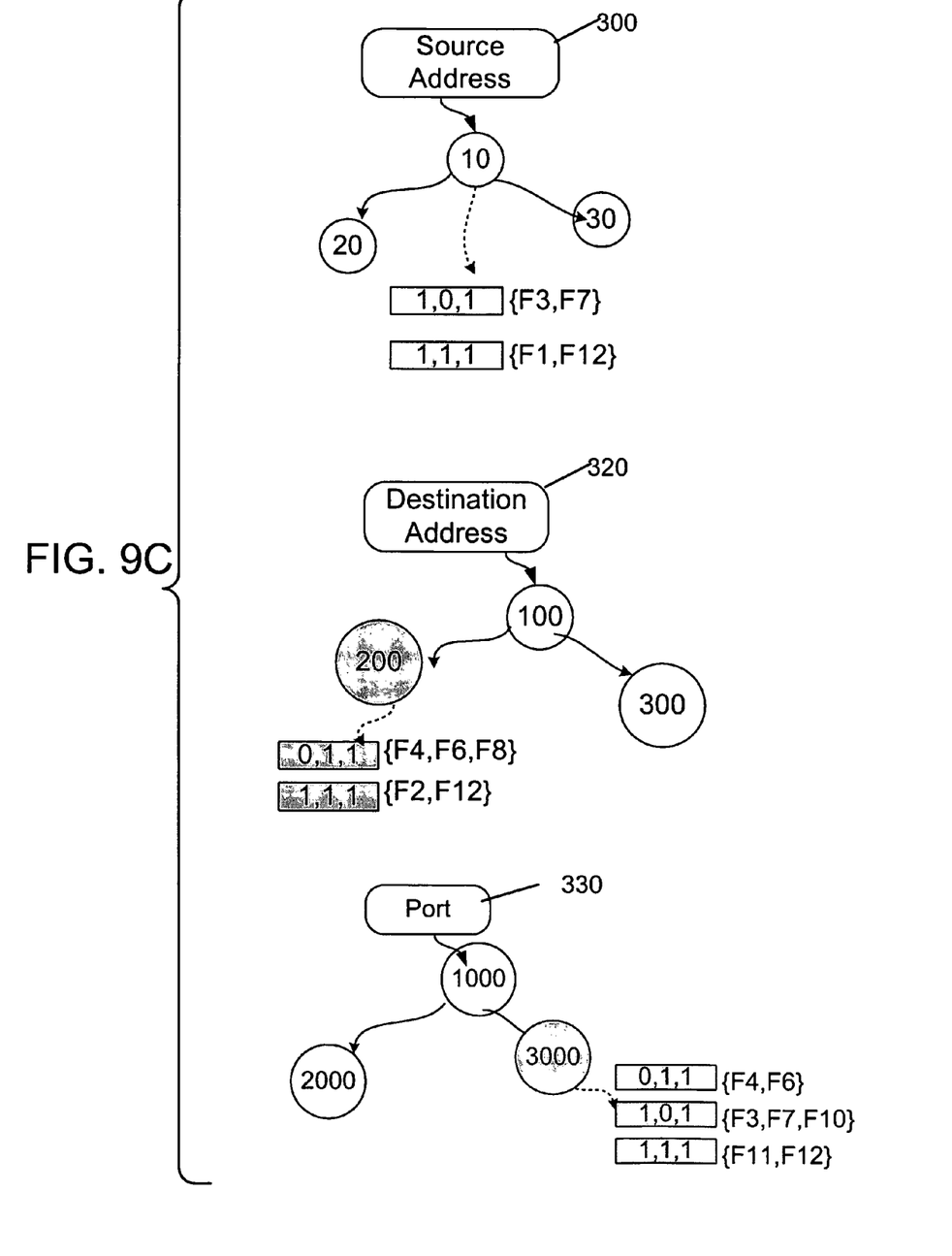

Referring to FIGS. 9A-C, an example of the filters generated using process 350 and the filter trees of FIG. 6A-C is shown. For example, a packet includes a source address value (202*a*) of 10, destination address value (204*a*) of 200, and a port value (206*a*) of 3000 as shown in FIG. 9A. As shown in table 370 (FIG. 9B) generated lists of filters are arranged according to the bitmask for each address value. The classification engine searches a red black tree (FIG. 9C) for each of the bitmask entries (e.g., a tree for the source address, a tree for the destination address and a tree for the port). Searching the source address tree 300 generates a list of filters associated with a source address of "10." Lists of filters including F3 and F7 for bitmask "101" and F1 and F12 for bitmask "111" are stored in memory (shown in blocks 372 and 374). Lists of filters associated with the destination address and port are generated using the destination address tree 320 and port tree 330 and stored in a similar manner according to the bitmask. Subsequent to the generation of lists of filters, the classification engine forms an intersection of the lists of filters for each bitmask. For example, for bitmask 011, an intersection set is generated for the filters shown in entries 376 and 378. This intersection set includes filters F4 and F6, but does not include filter F8. The determined set of filters for a particular packet is a union of the intersection sets (e.g., all members of each of the intersection sets) for each bitmask. In this example, the determined set includes filters F3, F4, F6, F7, and F12.

The process described herein can be implemented in digital electronic circuitry, in computer hardware, firmware, software, or in combinations of them. The process described herein can be implemented as a computer program product, e.g., a computer program tangibly embodied in an information carrier, e.g., in a machine-readable storage device or in a propagated signal, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims.

What is claimed is:

1. A method comprising:
receiving a packet that includes a set of values included in fields of a packet header;
associating a bitmask with the set of values included in the packet header;
for one or more of the bits in the associated bitmask:
selecting a search tree from a plurality of search trees based at least in part on a value of the associated bitmask and a value of the bit;
searching the selected search tree based on one or more of the values included in the packet header; and
returning filters for the packet based on the set of values included in the packet header; and
generating an intersected set of the returned filters.

2. The method of claim 1 further comprising grouping filters to form a tree according to the bitmask.

3. The method of claim 2 further comprising
determining if a bitmask entry is present in the bitmask list and
adding the bitmask entry for the bitmask if the bitmask entry is not present, to the bitmask list held by a node of the value tree.

4. The method of claim 2 further comprising adding a value node to a tree.

5. The method of claim 2 further comprising adding a filter to a filter tree held by a bitmask entry.

6. The method of claim 2 wherein grouping includes generating a balanced tree for the filters.

7. The method of claim 6 wherein the balanced tree is a red-black tree.

8. The method of claim 2 wherein grouping includes generating a balanced tree for the values.

9. The method of claim 8 wherein the balanced tree is a red-black tree.

10. The method of claim 1 wherein each tree includes a value tree and a node in the value tree includes a linked list of bitmask based filter trees.

11. The method of claim 10 wherein searching the tree includes determining filters based on the bitmask entries in the linked list held by the value nodes.

12. The method of claim 11 further comprising:
copying multiple filter sets to a memory; and
forming an intersection set of the multiple filter sets.

13. The method of claim 12 further comprising forming a union set of filters that is the union of the intersection sets to provide the union set of filters being used to process the packet.

14. The method of claim 6 further comprising providing a balanced tree for each filter element.

15. The method of claim 14 wherein the balanced tree is a red-black tree.

16. The method of claim 1 further comprising providing a balanced tree for each combination of bits in the bitmask.

17. The method of claim 16 wherein the balanced tree is a red-black tree.

18. A computer program product, tangibly embodied in a machine-readable storage device, for executing instruction on a processor, the computer program product being operable to cause a machine to:
receive a packet that includes a set of values included in fields of a packet header;
associate a bitmask with the set of values included in the packet header;
for one or more of the bits in the associated bitmask:
select a search tree from a plurality of search trees based at least in part on a value of the associated bitmask and a value of the bit;
search the selected tree based on one or more of the values included in the packet header; and
return filters for the packet based on the set of values included in the packet header; and
generate an intersected set of the returned filters.

19. The computer program product of claim 18 further comprising instructions to group filters to form a tree according to the bitmask.

20. The computer program product of claim 19 further comprising instructions to generate a balanced tree for the filters.

21. The computer program product of claim 19 further comprising instructions to generate a balanced tree for the values.

22. The computer program product of claim 18 further comprising instructions to copy multiple filter sets to a memory; and
form an intersection set of the multiple filter sets.

23. The computer program product of claim 18 further comprising instructions to form a union set of filters that is the union of the intersection sets to provide the union set of filters to process the packet.

24. The computer program product of claim 19 further comprising instructions to provide a balanced tree for each filter element.

25. The computer program product of claim 19 further comprising instructions to provide a balanced tree for each combination of bits in the bitmask.

26. A system comprising:
a networking appliance including a processor configured to:
receive a packet that includes a set of values included in fields of a packet header;
associate a bitmask with the set of values included in the packet header;
for one or more of the bits in the associated bitmask:
select a search tree from a plurality of search trees based at least in part on a value of the associated bitmask and a value of the bit;
search the selected tree, based on one or more of the values included in the packet header; and
return filters for the packet based on the set of values included in the packet header; and
generate an intersected set of the returned filters.

27. The system of claim 26 wherein the processor is farther configured to group filters to form a tree according to the bitmask.

28. The system of claim 26 wherein the processor is farther configured to copy multiple filter sets to a memory; and
form an intersection set of the multiple filter sets.

29. The system of claim 28 wherein the processor is further configured to form a union set of filters that is the union of the intersection sets to provide the union set of filters being used to process the packet.

30. Apparatus comprising:
a processor configured to:
receive a packet that includes a set of values included in fields of a packet header;
associate a bitmask with the set of values included in the packet header;
for one or more of the bits in the associated bitmask:
select a search tree from a plurality of search trees based at least in part on a value of the associated bitmask and a value of the bit;
search the selected search tree, based on one or more of the values included in the packet header; and
return filters for the packet based on the set of values included in the packet header; and
generate an intersected set of the returned filters.

31. The apparatus of claim 30 wherein the processor is further configured to group filters to form a tree according to the bitmask.

32. The apparatus of claim 30 wherein the processor is further configured to:
copy multiple filter sets to a memory; and
form an intersection set of the multiple filter sets.

33. The apparatus of claim 30 wherein the processor is further configured to form a union set of filters that is the union of the intersection sets to provide the union set of filters to process the packet.

* * * * *